July 29, 1969 CARL-AXEL STRÖMER 3,458,666

HOOK SWITCH ARRANGEMENT FOR WALL TELEPHONES

Filed Dec. 8, 1965

INVENTOR.
CARL-AXEL STRÖMER
BY Hane and Nydick
ATTORNEYS

United States Patent Office 3,458,666
Patented July 29, 1969

3,458,666
HOOK SWITCH ARRANGEMENT FOR WALL TELEPHONES

Carl-Axel Strömer, Bromma, Sweden, assignor to Telefonaktiebolaget L M Ericsson, Stockholm, Sweden, a corporation of Sweden Filed Dec. 8, 1965, Ser. No. 512,331
Claims priority, application Sweden, Feb. 10, 1965, 1,687/65
Int. Cl. H04m *1/08*
U.S. Cl. 179—100 3 Claims

ABSTRACT OF THE DISCLOSURE

This disclosure teaches a wall-mounted telephone which permits hanging of the handset theron without actuating the hook switch. Cradle posts are moveable downward under the full weight of the handset to actuate the hook switch. At least one of the posts has a projection directed toward the other post to seat the receiver hung thereover in a vertical position and the housing is formed to accommodate abutment of the transmitter thereagainst.

The present invention refers to a hook device for telephone wall instruments, which—irrespective of the conventional function of the hook device to actuate a hook switch in the instrument when restoring the handset—has for an object to allow hanging the handset on the instrument without actuating said hook switch. This is of interest in the case a person desires to leave the instrument for a moment without interrupting an established connection. It is very common with installations of wall telephone instruments that there is no piece of furniture, shelf or the like, within reach, on which the handset may be placed and, therefore, it is often left hanging on the cord.

Instruments are known the casing of which is so designed, that the handset may be hung up in a substantially vertical position by placing the receiver over an edge or the like provided at the upper part of the casing. This arrangement is however not possible with modern telephone instruments with an injection-moulded plastic casing because the designer of such instruments usually tries to avoid edges and projections in the casing so that he may achieve a stylish casing or to be able to use a simple moulding tool in the manufacturing process.

Modern instrument casings generally have at their upper part, where the hook device is located, a convex or sloping surface; therefore, the handset cannot be hung thereon. According to this invention the hook device has two symmetrically placed, vertically displaceable posts on which the handset is placed when the instrument is idle. Each post is at its upper end provided with a cradle for the handset, which cradle has a rise at the end turned towards the front side of the instrument for preventing the handset from sliding off towards said front side. The invention is principally characterized by the mentioned rises of both cradles being further provided with projections directed towards each other so that, when hanging up the handset in a principally vertical position with the receiver resting against the casing in the space between said posts, the receiver is by at least one of said cradles prevented from sliding off the casing.

Drawings

Figure 2:
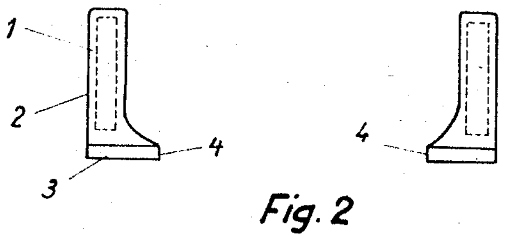
Figure 1:
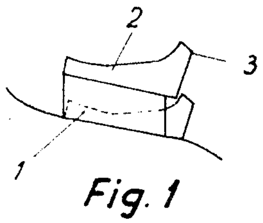
Figure 3:
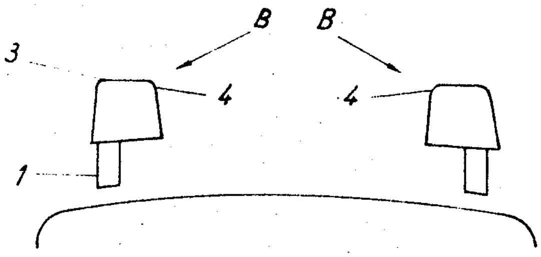
Figure 4:
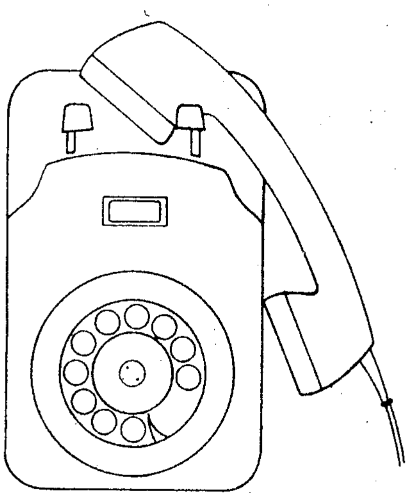
Figure 5:
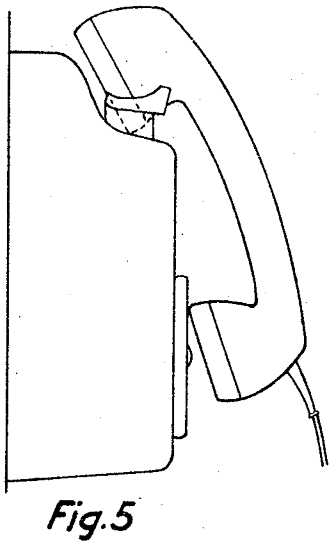

The invention will be further described by means of an embodiment with reference to the attached drawing, in which FIG. 1 shows the portion of the cradle post protruding above the telephone casing, FIG. 2 shows a top view of the posts in their relative position, FIG. 3 shows said posts in front view, FIG. 4 shows a telephone instrument with the handset hung over one side, and FIG. 5 an instrument seen from the side with the handset hung over the front of the instrument.

Preferred embodiment

The cradle post comprises a flat piece 1 that is in a conventional way supported in the casing of the instrument, so that it may be displaced in the vertical direction. It is biassed from within the instrument by a spring force that, when the handset is removed, holds the post in an upper position. When, in normal hanging up, the handset is restored to the cradle posts with its intermediate portion (between its transmitter and receiver) spanning both cradle posts, the cradle posts are forced down to their lower positions as indicated by dotted lines (see FIG. 1). Each cradle post is at its top provided with a cradle 2 intended to support the handset and consequently shaped substantially according to the cross section of the handset handle. The cradle is toward the front of the instrument provided with a rise 3 intended for preventing the handset from sliding off towards the front. On the two posts rises 3 of the respective cradles have parts 4 drawn out laterally towards each other. The portion 4 are designed to prevent a handset, hung up with the receiver resting against the casing in the space between the posts, from slipping down from the casing. At hanging up the handset in the way shown in FIG. 4 as well as in that shown in FIG. 5 the receiver rests with its lower edge against the casing, and the posts are in their upper position so that the hook switch contacts are not actuated. The pressure exerted by the receiver against one post or the other is directed substantially in the horizontal direction, so that the vertical force component is much lower than the one required for pressing down the respective post.

An involuntary pressing down of any of the posts when restoring the handset is in the shown embodiment fully precluded. Upon hanging up of the handset over the side of the instrument it is difficult to press down the post by means of the annular rim of the receiver. The surfaces of the receiver as well as of the cradle are so smooth that the receiver automatically slips down on the side of the post. A person who intentionally tries to press down the post by directing the annular rim of the receiver against the rise 3 has to guide the handset with a very steady hand in order to succeed.

Upon hanging up the handset over the front side of the instrument a simultaneous pressing down of both posts by means of the receiver is still much more difficult. This is because a pressure exerted by the receiver housing against the upper edges of the cradles gives forces against the posts approximately in the directions indicated by the arrows B (FIG. 3), whereby the posts because of friction in their guides are self-locking.

I claim:

1. In a wall-mounted telephone which includes a handset having a transmitter and a receiver at opposite ends thereof and each provided with an annular rim and including a housing and further including a hook switch,
a pair of cradle posts each penetrating the housing,
each of the posts provided with biasing means against which it is moveable downward under the full weight of the handset to actuate the hook switch,
at least one of the posts adapted to seat the annular rim of the receiver hung thereover and the housing positioned to accommodate simultaneous abutment of the annular rim of the transmitter thereagainst so that a substantial portion of the weight of the handset is carried by the housing whereby activating the hook switch is avoided.

2. In a wall-mounted telephone which includes a handset having a transmitter and a receiver at opposite ends thereof and each provided with an annular rim and including a housing which has a front and a smooth top which slopes toward the front and further including a hook switch, a pair of cradle posts each penetrating the housing and positioned above the top, each of the posts provided with biasing means against which it is moveable downward under the full weight of the handset to actuate the hook switch, each of the posts defining a rise toward the front, each of the posts having a projection adjacent its rise and directed toward the other post to receive the handset when hung in a vertical position with the annular rim of the receiver positioned between the posts and the front positioned to accommodate simultaneous abutment of the annular rim of the transmitter thereagainst so that a substantial portion of the weight of the handset is carried by the housing whereby activating the hook switch is avoided.

3. The combination of claim 2 and the posts symmetrically positioned relative the housing.

References Cited

UNITED STATES PATENTS

| | | | |
|---|---|---|---|
| 2,152,494 | 3/1939 | Obergfell | 179—100 |
| 2,749,395 | 6/1956 | Droel et al. | 179—178 |

OTHER REFERENCES

Automatic Electric Catalogue 4055–E, "Monophones and Substation Accessories," letter of transmittal dated July 29, 1949, p. 2.

KATHLEEN H. CLAFFY, Primary Examiner

W. A. HELVESTINE, Assistant Examiner

U.S. Cl. X.R.

179—179